(12) United States Patent
Liu et al.

(10) Patent No.: US 11,669,579 B2
(45) Date of Patent: Jun. 6, 2023

(54) METHOD AND APPARATUS FOR PROVIDING SEARCH RESULTS

(71) Applicant: Baidu Online Network Technology (Beijing) Co., Ltd., Beijing (CN)

(72) Inventors: Guoqing Liu, Beijing (CN); Yinfang Jia, Beijing (CN); Yanfeng Zhu, Beijing (CN); Cong Han, Beijing (CN); You Han, Beijing (CN); Peng Li, Beijing (CN); Yueran Dang, Beijing (CN); Min Chen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 125 days.

(21) Appl. No.: 16/540,599

(22) Filed: Aug. 14, 2019

(65) Prior Publication Data

US 2019/0370305 A1    Dec. 5, 2019

Related U.S. Application Data

(63) Continuation of application No. PCT/CN2017/100474, filed on Sep. 5, 2017.

(30) Foreign Application Priority Data

Feb. 15, 2017    (CN) .......................... 201710081698.8

(51) Int. Cl.
*G06F 7/02*    (2006.01)
*G06F 16/00*   (2019.01)
(Continued)

(52) U.S. Cl.
CPC ...... *G06F 16/9538* (2019.01); *G06F 16/9535* (2019.01); *G06F 16/9558* (2019.01);
(Continued)

(58) Field of Classification Search
CPC ............ G06F 16/9538; G06F 16/9558; G06F 16/9535; G06F 16/248; G06F 16/438;
(Continued)

(56) References Cited

U.S. PATENT DOCUMENTS

2005/0086045 A1    4/2005   Murata
2013/0124449 A1*   5/2013   Pinckney ............ G06F 16/2425
                                                 706/52

(Continued)

FOREIGN PATENT DOCUMENTS

CN    102096717 A    6/2011
CN    104598445 A    5/2015
(Continued)

OTHER PUBLICATIONS

International Search Report for PCT Application No. PCT/CN2017/100474-4 pages (dated Dec. 7, 2017).

(Continued)

*Primary Examiner* — Bruce M Moser
(74) *Attorney, Agent, or Firm* — Knobbe, Martens, Olson & Bear, LLP (57) ABSTRACT

Disclosed are a method and apparatus for providing search results. The method may include: carrying out search intention analysis on an input search term so as to determine whether the search term includes an answer requirement; if so, using the search term to retrieve answer content corresponding to the answer requirement; obtaining content to be recommended associated with the answer content; and combining the answer content with the content to be recommended so as to generate at least one search result. Abundant search results can be efficiently provided.

11 Claims, 6 Drawing Sheets

(51) Int. Cl.
*G06F 16/9538* (2019.01)
*G06F 16/955* (2019.01)
*G06F 16/9535* (2019.01)
*G06F 16/538* (2019.01)
*G06F 16/248* (2019.01)
*G06F 16/738* (2019.01)

(52) U.S. Cl.
CPC .......... *G06F 16/248* (2019.01); *G06F 16/538* (2019.01); *G06F 16/738* (2019.01)

(58) Field of Classification Search
CPC .... G06F 16/538; G06F 16/738; G06F 16/838; G06F 40/295
See application file for complete search history.

(56) References Cited

U.S. PATENT DOCUMENTS

| | | | | |
|---|---|---|---|---|
| 2014/0188835 A1* | 7/2014 | Zhang | ............... | G06F 16/951 707/706 |
| 2014/0280193 A1* | 9/2014 | Cronin | ............... | G06N 20/00 707/741 |
| 2015/0006492 A1* | 1/2015 | Wexler | ............... | G06F 16/248 707/694 |
| 2016/0140216 A1 | 5/2016 | Allen et al. | | |
| 2016/0180217 A1* | 6/2016 | Boston | ............. | G06F 16/24578 706/46 |
| 2016/0196491 A1* | 7/2016 | Chandrasekaran | ... | G06F 16/248 706/50 |
| 2016/0247068 A1 | 8/2016 | Lin | | |
| 2017/0068670 A1* | 3/2017 | Orr | ............... | G06F 16/48 |
| 2017/0116341 A1* | 4/2017 | Wenger | ............... | G06F 16/287 |
| 2017/0364520 A1* | 12/2017 | Venkataraman | .... | G06F 16/3329 |
| 2018/0011830 A1* | 1/2018 | Iida | ............... | G06F 40/169 |
| 2018/0173694 A1* | 6/2018 | Liu | ............... | G06F 40/295 |

FOREIGN PATENT DOCUMENTS

| | | |
|---|---|---|
| CN | 105069077 A | 11/2015 |
| CN | 106874467 A | 6/2017 |
| JP | 2014132465 | 7/2014 |
| JP | 2015133047 | 7/2015 |
| KR | 10-2009-0058262 A | 6/2009 |
| KR | 10-2010-0083614 A | 7/2010 |

OTHER PUBLICATIONS

Mathur et al., "Question Answering System: A Survey", 2015 International Conference on Smart Technologies and Management for Computing, Communication, Controls, Energy and Materials (ICSTM)—12 pages ( May 2015).

* cited by examiner

METHOD AND APPARATUS FOR PROVIDING SEARCH RESULTS

CROSS-REFERENCE TO RELATED APPLICATIONS

This is a continuation of International Application PCT/CN2017/100474, with an international filing date of Sep. 5, 2017, which claims priority to Chinese Application No. 201710081698.8, filed on Feb. 15, 2017, the entire disclosure of each of which is hereby incorporated by reference.

TECHNICAL FIELD

The present disclosure relates to the field of computer technology, specifically to the field of search technology, and more specifically to a method and apparatus for providing a search result.

BACKGROUND

With the development of Internet technology, users' search requirements for question-and-answer information are increasing. In the current search technology, an answer matching a question of a user is displayed in a search result item in the middle of a page, and recommended content is separately displayed at a fixed position of the page (e.g., a side edge of the page or the bottom of the page). In this way, the answer and the recommended content obtained through a search of the user are scattered. Moreover, due to the restriction of the display area of the page, the information that the user may acquire in a search result page is very limited. If more information is desired to be acquired, operations such as page switching, clicking to filter, or search term switching need to be performed on a terminal. Thus, the efficiency in providing the information for the user needs to be improved.

SUMMARY

In order to solve one or more technical problems in the foregoing Background section, the present disclosure provides a method and apparatus for providing a search result.

In a first aspect, the present disclosure provides a method for providing a search result. The method includes: performing a search intent analysis on an inputted search term, to determine whether the search term contains an answer requirement; retrieving, if the search term contains the answer requirement, answer content corresponding to the answer requirement using the search term; acquiring to-be-recommended content associated with the answer content; and combining the answer content and the to-be-recommended content, to generate at least one search result.

In some embodiments, the performing a search intent analysis on an inputted search term, to determine whether the search term contains an answer requirement includes: matching the search term and a preset question keyword library; and determining, if the matching is successful, the search term containing the answer requirement.

In some embodiments, the performing a search intent analysis on an inputted search term, to determine whether the search term contains an answer requirement includes: acquiring a historical search result of the search term and category information of the historical search result; and determining, in response to determining the acquired category information being a question-answer category or a content recommendation category, the search term containing the answer requirement.

In some embodiments, the acquiring to-be-recommended content associated with the answer content includes: extracting a keyword, in the answer content, corresponding to the answer requirement; matching the extracted keyword and a preset keyword configured for preset recommendation content; and defining preset recommendation content corresponding to the successfully matched preset keyword as the to-be-recommended content associated with the answer content.

In some embodiments, the combining the answer content and the to-be-recommended content, to generate at least one search result includes: combining the extracted keyword and the preset recommendation content corresponding to the keyword, to generate a corresponding search result.

In some embodiments, the method further includes: pushing each search result.

In some embodiments, the pushing each search result includes: pushing the each search result to a search result page for display; and/or creating a link for pointing to a page including a plurality of search results, and pushing the link.

In a second aspect, the present disclosure provides an apparatus for providing a search result. The apparatus includes: an analyzing unit, configured to perform a search intent analysis on an inputted search term, to determine whether the search term contains an answer requirement; a retrieving unit, configured to retrieve, if the search term contains the answer requirement, answer content corresponding to the answer requirement using the search term; an acquiring unit, configured to acquire to-be-recommended content associated with the answer content; and a generating unit, configured to combine the answer content and the to-be-recommended content, to generate at least one search result.

In some embodiments, the analyzing unit is further configured to determine whether the search term contains the answer requirement by: matching the search term and a preset question keyword library; and determining, if the matching is successful, the search term containing the answer requirement.

In some embodiments, the analyzing unit is further configured to determine whether the search term contains the answer requirement by: acquiring a historical search result of the search term and category information of the historical search result; and determining, in response to determining the acquired category information being a question-answer category or a content recommendation category, the search term containing the answer requirement.

In some embodiments, the acquiring unit is further configured to acquire the to-be-recommended content associated with the answer content by: extracting a keyword, in the answer content, corresponding to the answer requirement; matching the extracted keyword and a preset keyword configured for preset recommendation content; and defining preset recommendation content corresponding to the successfully matched preset keyword as the to-be-recommended content associated with the answer content.

In some embodiments, the generating unit is further configured to generate the at least one search result by: combining the extracted keyword and the preset recommendation content corresponding to the keyword, to generate a corresponding search result.

In some embodiments, the apparatus further includes: a pushing unit, configured to push each search result.

In some embodiments, the pushing unit is further configured to push the each search result by: pushing the each search result to a search result page for display; and/or creating a link for pointing to a page including a plurality of search results, and pushing the link.

In a third aspect, the present disclosure provides a server. The server includes: one or more processors; and a storage device, configured to store one or more programs. The one or more programs, when executed by the one or more processors, cause the one or more processors to implement the method for providing a search result provided in the first aspect of the present disclosure.

In a fourth aspect, the present disclosure provides a computer readable storage medium storing a computer program. The computer program, when executed by a processor, implements the method for providing a search result provided in the first aspect of the present disclosure.

According to the method and apparatus for providing a search result provided by some embodiments of the present disclosure, whether the search term contains the answer requirement is determined by performing the search intent analysis on the search term. Next, when it is determined that the inputted search term contains the answer requirement, the answer content corresponding to the answer requirement is retrieved using the search term. Then, the to-be-recommended content associated with the answer content is acquired. Finally, the answer content is combined with the to-be-recommended content to generate the at least one search result. Thus, abundant search results that better fulfill a potential requirement of the user can be quickly provided.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
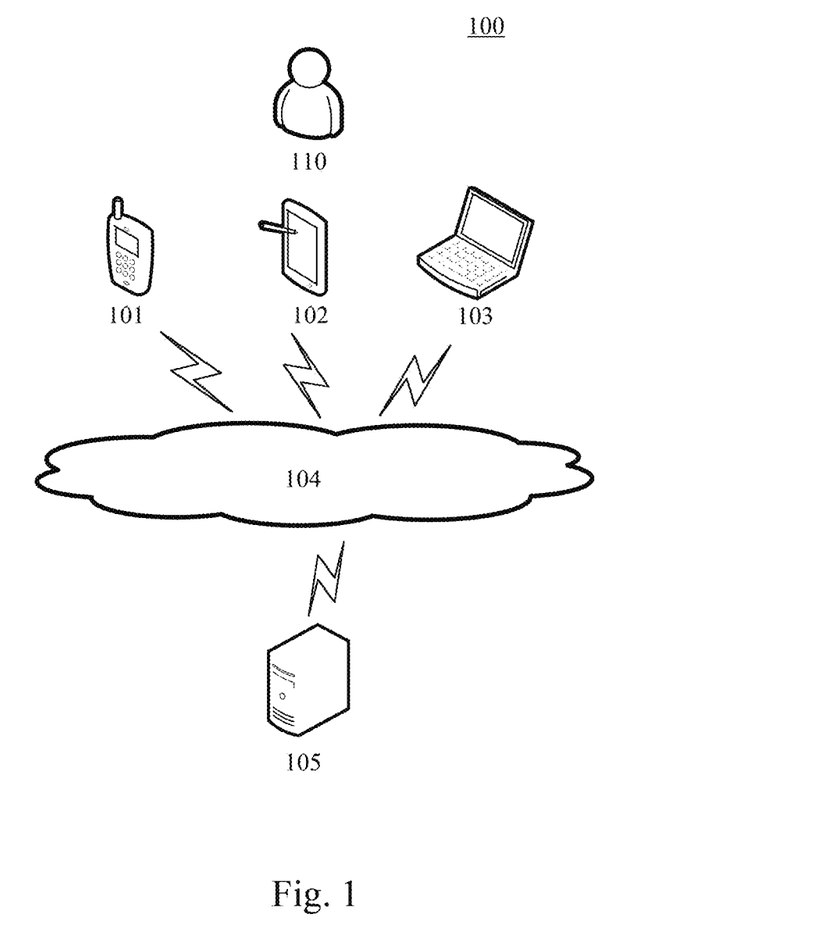
FIG. 1 is a diagram of an example system architecture in which an embodiment of the present disclosure may be implemented.

FIG. 1 shows an example system architecture 100 in which a method for providing a search result or an apparatus for providing a search result may be implemented.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may interact with the server 105 via the network 104 using the terminal devices 101, 102 and 103, to receive or send messages. Various information acquiring applications (e.g., web browser applications, search applications, or social platform software) may be installed on the terminal devices 101, 102 and 103.

The terminal devices 101, 102 and 103 may be various electronic devices having display screens and supporting webpage browsing, including but not limited to, smart phones, tablet computers, e-book readers, MP3 (Moving Picture Experts Group Audio Layer III) players, MP4 (Moving Picture Experts Group Audio Layer IV) players, laptop portable computers and desktop computers.

The server 105 may be a server providing various services, for example, a webpage data server providing a data support for a search request of the terminal devices 101, 102 and 103. The webpage data server may perform processing such as word segmentation and webpage information scraping on the received search request, and return the processing result (e.g., a search result) to the terminal devices.

It should be noted that the method for providing a search result provided by some embodiments of the present disclosure is generally performed by the server 105. Correspondingly, the apparatus for providing a search result is generally provided in the server 105.

It should be appreciated that the numbers of the terminal devices, the networks, and the servers in FIG. 1 are merely illustrative. Any number of terminal devices, networks, and servers may be provided based on actual requirements.

Figure 2:
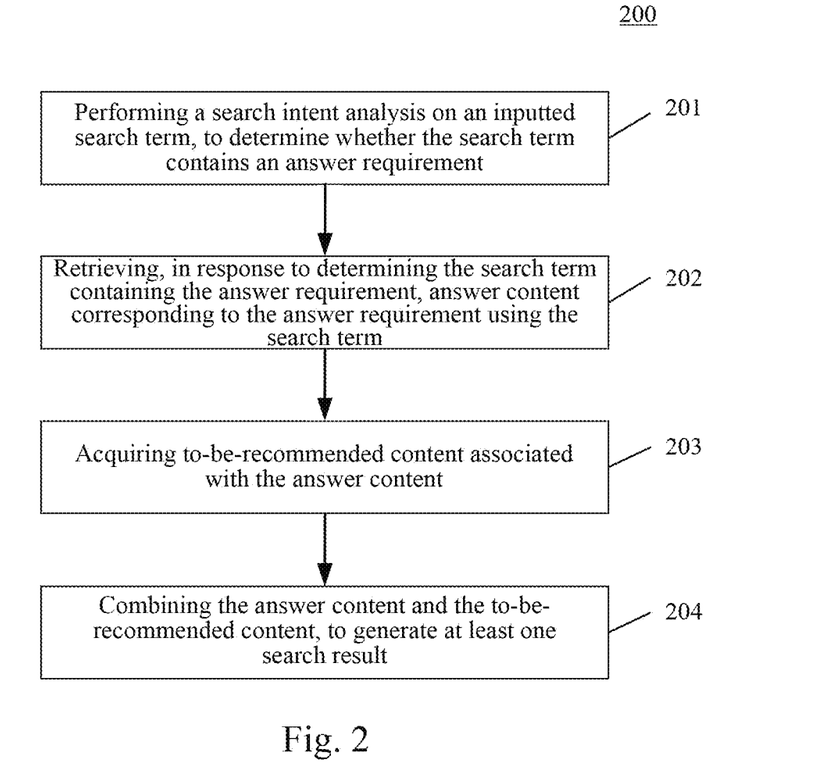
FIG. 2 is a flowchart of an embodiment of a method for providing a search result.

Further referring to FIG. 2, a flow 200 of an embodiment of a method for providing a search result according to the present disclosure is illustrated. The method for providing a search result includes the following steps.

Step 201, performing a search intent analysis on an inputted search term, to determine whether the search term contains an answer requirement.

In this embodiment, an electronic device (e.g., the server 105 shown in FIG. 1) on which the method for providing a search result is performed may acquire the search term inputted by a user, and perform analysis on the search term, to determine whether the search term contains the answer requirement. That is, it is determined whether the user inputting the search term has a requirement to acquire an answer through a question.

Generally, the user may input the search term using an input interface provided by a browser, and perform a search using a search engine. The input interface may be, for example, a search box, and thus, the user may input the search term by typing a text. The input interface may also be, for example, an audio interface, and thus, the user may input voice information through the audio interface, and the electronic device backend may convert the voice information into a corresponding text search term. The electronic device may acquire the inputted search term after detecting that the input interface is invoked.

After acquiring the inputted search term, the electronic device may first perform the word segmentation on the acquired search term to segment the inputted search term in a sequential form into separate words, and analyze the search intent of the user based on the word segmentation result and the search term in the sequential form.

In this embodiment, the search intent analysis may be performed in various ways. For example, the search intent corresponding to the search term may be analyzed using a trained search intent analysis model in a machine learning approach. Another alternative approach is to analyze based on the segmented words of the search term and a search intent contained in words related to the segmented words, to determine whether the user has a requirement of a preset category. In some alternative implementations, the preset category may be preconfigured for various words, for example, a question category or a resource category. For example, words such as "where," "which" and "when" may be preconfigured as the question category, and words such as "downloading" and "viewing" may be preconfigured as the resource category. If the word segmentation result includes a word configured as the question category, it may be determined that the user has the requirement of the question category, and thus, it may be determined that the search term inputted by the user contains the answer requirement.

In some alternative implementations, whether the inputted search term has the answer requirement may be analyzed by: matching the search term and a preset question keyword library; and determining, if the matching is successful, the search term containing the answer requirement. Specifically, the electronic device may store the preset question keyword library. If the search term includes a word matching a word in the preset question keyword library, it may be determined that the search term contains the answer requirement. The preset keyword library may include a word that has a strong association with a question intent. As an example, in an actual scenario, if the search term inputted by the user is "a recommendation for a gift given to an elder," and "recommendation" matches a question keyword in the preset question keyword library, it may be determined that the search term "a recommendation for a gift given to an elder" contains the answer requirement. Further alternatively, the preset question keyword library may be a word library that is directly associated with the answer requirement or has a potential answer requirement and is manually configured or trained based on a machine learning method.

Figure 3:
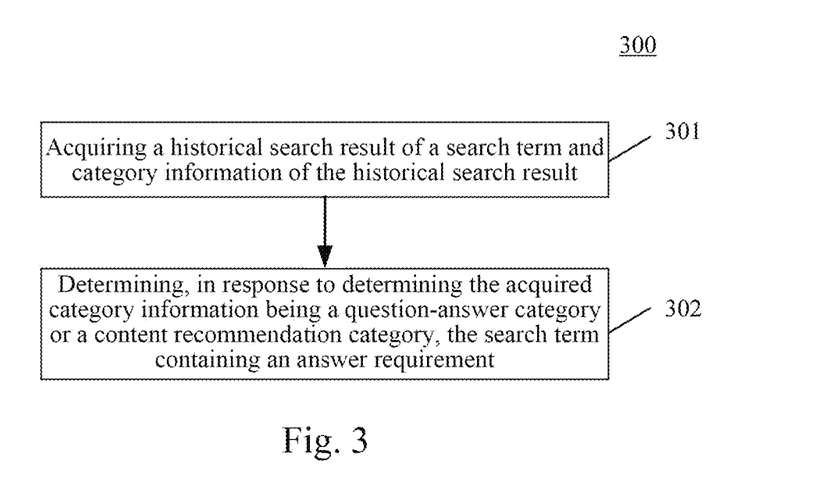
FIG. 3 is a flowchart of a specific implementation of a method for determining whether a search term contains an answer requirement according to an embodiment of the present disclosure.

Referring to FIG. 3, FIG. 3 is a schematic diagram of a flow 300 of a specific embodiment of a method for determining whether a search term contains an answer requirement.

As shown in FIG. 3, in step 301, acquiring a historical search result of the search term and category information of the historical search result.

The electronic device may store historical search results of various search terms. When determining whether the search term acquired in step 201 contains the answer requirement, the electronic device may search a large number of stored historical search results for the historical search result of the search term acquired in step 201, and determine the category information of the historical search result. The category information may include a question-answer category, a content recommendation category, a resource category, etc. The category information of each historical search result may be determined by the source website of the historical search result, the category of the content of the historical search result. Further, the category information of the each historical search result may be consistent with the category information of the source website of the historical search result or the category of the content of the historical search result. For example, if the source website of a historical search result is "Baidu Knows" and the category information of "Baidu Knows" is the question-answer category, it may be determined that the category information of the historical search result is the question-answer category. Alternatively, if a historical search result includes a plurality of dialogues in a form of question-and-answer sentence, it may be determined that the category information of the historical search result is the question-answer category. Alternatively, when a historical search result includes a plurality of pieces of recommendation content (i.e., the historical search term triggers a content recommendation), it may be determined that the content of the historical search result is the content recommendation category, and then, it may be determined that the category information of the historical search result is the content recommendation category. In some implementations, the historical search result includes a related search expression of the search term determined by the electronic device based on a large data amount of query histories of different users, and the related search expression may be used as the historical search result. It is determined whether the search term contains the answer requirement based on the category of the related search expression. For example, when the related search expression includes an interrogative sentence, it may be determined that the category information of the historical search result of the search term is the question-answer category.

It should be noted that the category information of the historical search result may be preconfigured, or may be obtained by analyzing based on the attributes, such as the source website and the content, of the historical search result. The analysis on the category information of various websites and the category information of different contents may use various existing category analysis methods, which will not be specifically defined here.

In step 302, determining, in response to determining the acquired category information being a question-answer category or a content recommendation category, the search term containing the answer requirement.

When the category information of the historical search result acquired in step 301 is the question-answer category or the content recommendation category, it may be determined that the user inputting the search term has a potential requirement for the question, that is, it may be determined that the search term inputted by the user contains the answer requirement. In other words, if the category information is the question-answer category or the content recommendation category, it may be determined that the actual search intent of the user is to propose a question required to be answered.

In a further embodiment, if the category information is neither the question-answer category nor the content recommendation category, it may be determined that the search term acquired in step 201 does not contain the answer requirement.

Through the flow 300 of the alternative implementation of determining whether the search term contains the answer requirement and other alternative implementations of determining whether the search term contains the answer requirement, the electronic device may implement an estimation on the search intent of the user, to provide information fulfilling a requirement of the user using the analysis result.

Returning to FIG. 2, in step 202, retrieving, in response to determining the search term containing the answer requirement, answer content corresponding to the answer requirement using the search term.

In this embodiment, after determining that the search term contains the answer requirement, that is, determining that the user has an intent to propose a question to be answered, the electronic device may retrieve, in a database, the answer content corresponding to the answer requirement.

Specifically, the electronic device may directly retrieve using the search term, filter a retrieval result of an answer category, and extract the answer content in the retrieval result of the answer category. Alternatively, when the search intent analysis is performed on the search term, the answer requirement corresponding to the search term may be analyzed, and the answer content is obtained by retrieving based on the answer requirement. For example, after the answer requirement of the user is determined, the answer content corresponding to the answer requirement may be scraped from a knowledge website (e.g., "Baidu Knows"). Alternatively, in addition to the search term, the electronic device may add an associated word and an auxiliary word based on the answer requirement, to expand the search term to a search expression of the question-answer category to perform retrieving. For example, when the inputted search term is "luxury bag", the search term may be expanded to the search expression of the question-answer category such as "which are luxury bags" to perform retrieving, so that the electronic device quickly retrieves the answer content corresponding to the search expression of the question-answer category.

Step 203, acquiring to-be-recommended content associated with the answer content.

In this embodiment, the electronic device may search a to-be-recommended content library for the to-be-recommended content associated with the answer content. The to-be-recommended content library includes the to-be-recommended content having a recommendation attribute, and the recommendation attribute is used to identify an attribute characteristic of the to-be-recommended content. Specifically, the recommendation attribute may be characteristic information that may match the to-be-recommended content.

In some alternative implementations, the recommendation attribute may be a preset keyword configured for the to-be-recommended content. At this time, the to-be-recommended content associated with the answer content may be acquired by: first, extracting a keyword, in the answer content, corresponding to the answer requirement, then, matching the extracted keyword and a preset keyword configured for preset recommendation content, and defining preset recommendation content corresponding to the successfully matched preset keyword as the to-be-recommended content. Specifically, the electronic device may extract one or more keywords in the answer content, then determine whether the extracted keywords correspond to the answer requirement, and matching each extracted keyword corresponding to the answer requirement and a preset keyword of each piece of to-be-recommended content. If the matching is successful, preset recommendation content corresponding to the successfully matched preset keyword is used as the to-be-recommended content corresponding to the extracted keyword, that is, the to-be-recommended content associated with the answer content. In this way, when the answer content includes a plurality of keywords, different to-be-recommended content corresponding to each keyword may be obtained by performing matching.

Alternatively, the to-be-recommended content may be content pre-stored by the electronic device and configured with the preset keyword. The to-be-recommended content may contain more abundant recommendation information, which may be, for example, news information and an advertisement.

Step 204, combining the answer content and the to-be-recommended content, to generate at least one search result.

After the to-be-recommended content associated with the answer content is acquired, the to-be-recommended content may be combined with the corresponding answer content, to generate the search result. Specifically, for one piece of answer content retrieved in step 202, it may be combined with one or more pieces of to-be-recommended associated with the answer content to generate one search result. If a plurality of pieces of answer content are retrieved in step 202, a plurality of corresponding search results may be generated in this embodiment. The combination may refer to that the answer content and the to-be-recommended content associated with the answer content are combined, or the association relationship between the answer content and the to-be-recommended content is stored into the database. In this way, each search result contains the answer content and the to-be-recommended content associated with the answer content, and thus the more abundant information may be quickly provided, and the user may acquire the answer content (i.e., the related recommendation information) with just one search, which simplifies the operations of the user acquiring the information.

In some alternative implementations, if the keyword, in the answer content, corresponding to the answer requirement is extracted in step 203, the extracted keyword may be combined with the preset recommendation content successfully matched with the keyword, to generate the corresponding search result. That is, the answer content is replaced by the keyword, and the search result is generated by combining the keyword with the corresponding to-be-recommended content. Thus, the search result may be simplified, and key information the user is more interested in may be provided, which facilitates the user quickly acquiring the information.

Thus, in the method for providing a search result in this embodiment, the search intent of the search term is analyzed, the to-be-recommended content associated with the answer requirement is acquired when the search term is determined to contain the answer requirement, and the retrieved answer content is combined with the to-be-recommended content to generate the search result. Accordingly, the more abundant information that better fulfills a potential requirement of the user may be quickly provided in the search result.

Figure 4:
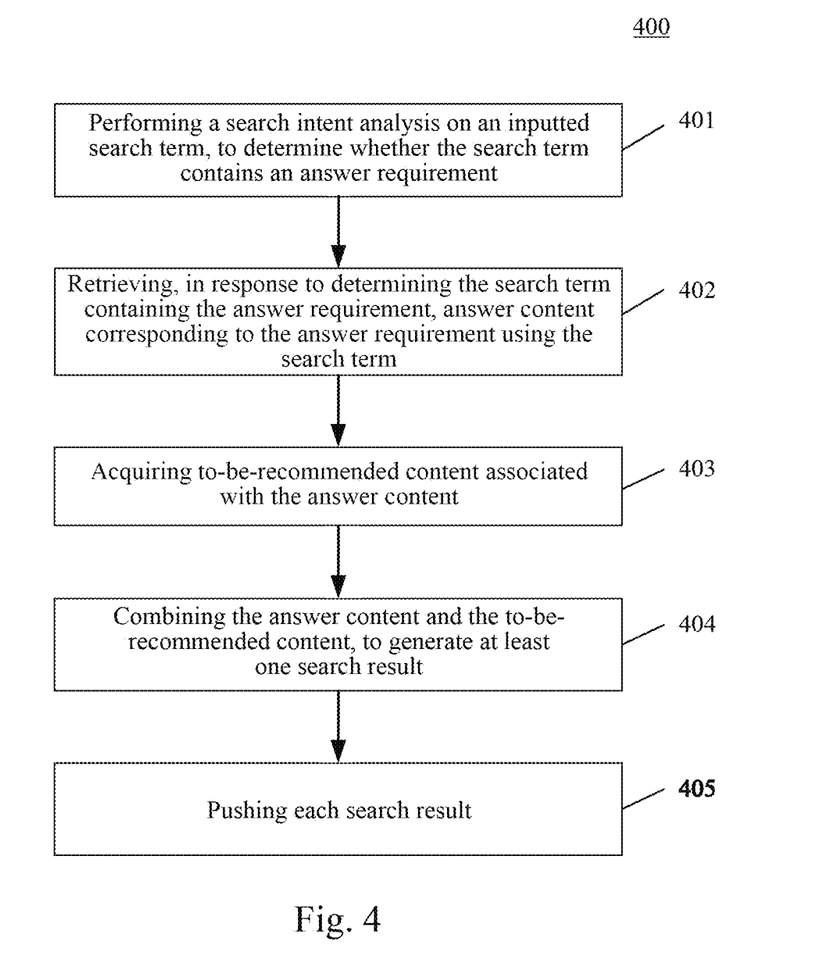
FIG. 4 is a flowchart of another embodiment of the method for providing a search result.

Referring to FIG. 4, FIG. 4 is a flowchart of another embodiment of the method for providing a search result. The flow 400 of the method for providing a search result includes the following steps.

Step 401, performing a search intent analysis on an inputted search term, to determine whether the search term contains an answer requirement.

In this embodiment, an electronic device (e.g., the server 105 shown in FIG. 1) on which the method for providing a search result is performed may acquire the search term inputted by a user, and perform analysis on the search term, to determine whether the search term contains the answer requirement. That is, it is determined whether the user inputting the search term has a requirement to acquire an answer through a question. Specifically, after acquiring the inputted search term, the electronic device may perform the search intent analysis in various ways. For example, the search intent corresponding to the search term may be analyzed using a trained search intent analysis model. Alternatively, the analysis is performed based on the segmented words of the search term and a search intent contained in words related to the segmented words, to determine whether the user has a requirement of a preset category. Alternatively, the search term may be matched with a preset question keyword library. If the matching is successful, it is determined that the search term contains the answer requirement. The preset keyword library includes a word that has a strong association with a question intent. As an example, in an actual scenario, if the search term inputted by the user is "a recommendation for a gift given to an elder," and "recommendation" matches the preset question keyword library, it may be determined that the search term "a recommendation for a gift given to an elder" contains the answer requirement.

Alternatively, it may also be determined whether the search term contains the answer requirement by: acquiring a historical search result of the search term and category information of the historical search result, and determining, in response to determining that the acquired category information is a question-answer category or a content recommendation category, the search term containing the answer requirement. That is, whether the search term contains the answer requirement may also be determined based on the source website of the historical search result, the category of the content of the historical search result.

Step 402, retrieving, in response to determining the search term containing the answer requirement, answer content corresponding to the answer requirement using the search term.

In this embodiment, after determining that the search term contains the answer requirement, that is, determining that the user has an intent to propose a question to be answered, the electronic device may retrieve, in a database, the answer content corresponding to the answer requirement.

Step 403, acquiring to-be-recommended content associated with the answer content.

In this embodiment, the to-be-recommended content associated with the answer content may be found in a to-be-recommended content library. For example, the relevance of the answer content to the to-be-recommended content may be determined by performing a semantic analysis on the answer content and the to-be-recommended content. To-be-recommended content having a high relevance is selected as the to-be-recommended content associated with the answer content. Alternatively, in some alternative implementations, a keyword, in the answer content, corresponding to the answer requirement may be extracted, and then the extracted keyword is matched with a preset keyword configured for preset recommendation content. Preset recommendation content corresponding to the successfully matched preset keyword is defined as the to-be-recommended content associated with the answer content.

Step 404, combining the answer content and the to-be-recommended content, to generate at least one search result.

After the to-be-recommended content associated with the answer content is acquired, the to-be-recommended content may be combined with the corresponding answer content, to generate the search result. The combination may refer to that the answer content and the to-be-recommended content associated with the answer content are combined, or the association relationship between the answer content and the to-be-recommended content is stored into the database. In this way, each search result contains the answer content and the to-be-recommended content associated with the answer content.

In some alternative implementations, if the keyword, in the answer content, corresponding to the answer requirement is extracted in step 403, the extracted keyword may be combined with the preset recommendation content successfully matched with the keyword, to generate the corresponding search result. That is, the answer content is replaced by the keyword, and the search result is generated by combining the keyword with the corresponding to-be-recommended content. Thus, the search result may be simplified, and information the user is more interested in may be provided, which facilitates the user quickly acquiring the information.

It should be noted that the specific operations in the steps 401-404 are substantially the same as the specific operations in the steps 201-204, which will not be repeatedly described here.

Step 405, pushing each search result.

After generating the each search result, the electronic device (e.g., the server 105 shown in FIG. 1) may push the search result to a terminal device (e.g., the terminal devices 101, 102 and 103 shown in FIG. 1) receiving a user input. The terminal device may create a search result page, and the electronic device may push the search result to the search result page for display. The terminal device may render the search result to the search result page for display. A plurality of entry columns for displaying search results may be created in the search result page and the search results are displayed in the entry columns. Further, the electronic device may push the rankings of matching degrees corresponding to the search results (e.g., the rankings of the matching degrees between the answer content in the search results and the answer requirement) together. In this way, the terminal device may sequentially display corresponding search results according to the rankings of the matching degrees between the answer content in the various search results and the answer requirement. Here, each search result includes at least one piece of answer content and to-be-recommended content associated with the answer content. When displayed, each of the at least one piece of answer content may be displayed in association with the to-be-recommended content associated with the answer content.

In some alternative implementations, in order to save the display space occupied by the search result and simplify the search result page, the electronic device may create a link for pointing to a page including a plurality of search results, push the link to push the search results. In this way, the user may open the corresponding page including the plurality of search results by clicking on the link, to acquire the search results.

Accordingly, after receiving the search results pushed by the electronic device, the terminal device may display the search results using a plurality of display approaches. An alternative implementation is to simultaneously display the plurality of search results on the search result page, so that the user may obtain the answer content and the recommended content without other operations.

Figure 5A:
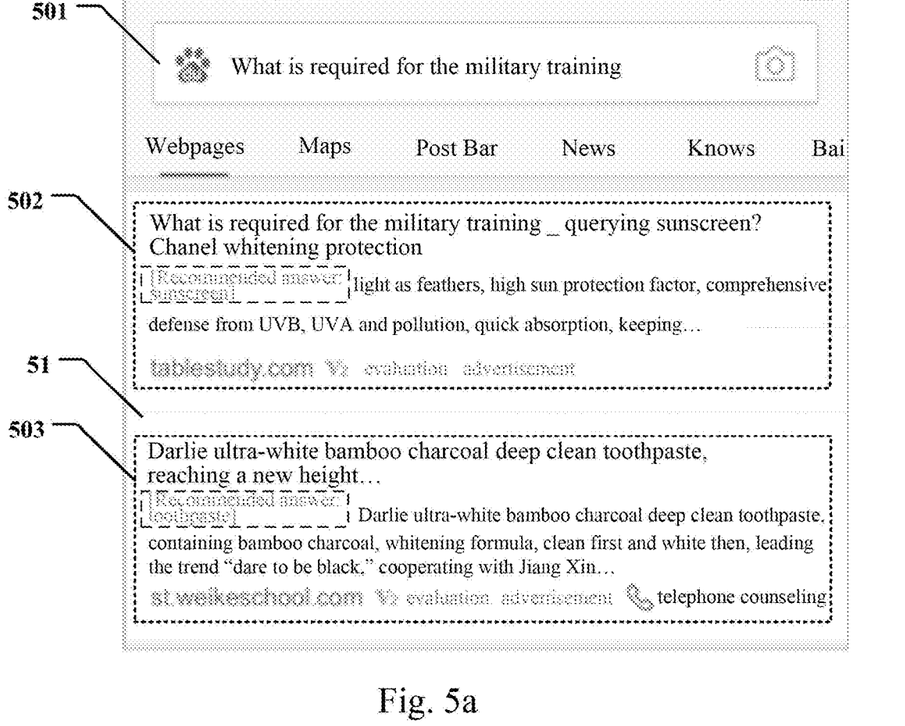
FIGS. 5a, 5b and 5c are schematic effect diagrams of application scenarios of the method for providing a search result according to some embodiments of the present disclosure.

Referring to FIG. 5a, FIG. 5a is a schematic effect diagram of an application scenario of the method for providing a search result according to some embodiments of the present disclosure. After the user types the search term "what is required for the military training" in the search box 501 in a browser provided by the terminal device or other applications that may support the search, the terminal may initiate a search request to the server. The server performs the search intent analysis on the search term, and may determine that the search term contains the answer requirement based on the keyword "what" included in the search term. At this time, the server may use the search term to retrieve the answer content corresponding to the answer requirement: "sunscreen," "toothpaste," etc. Afterwards, the server may find the to-be-recommended content (e.g., a sunscreen advertisement) associated with the sunscreen from the to-be-recommended content library (e.g., an advertisement database) at the backend, and combine the answer content "sunscreen" and the sunscreen advertisement as the search result 502. The server may find the to-be-recommended content (e.g., a toothpaste advertisement) associated with the toothpaste from the to-be-recommended content library (e.g., the advertisement database) at the backend, and combine the answer content "toothpaste" and the toothpaste advertisement as the search result 503. Then, the server may directly push the search result 502 and the search result 503 to the terminal device, and the terminal device may directly display the search result 502 and the search result 503 in the search result page 51.

Figure 5B:
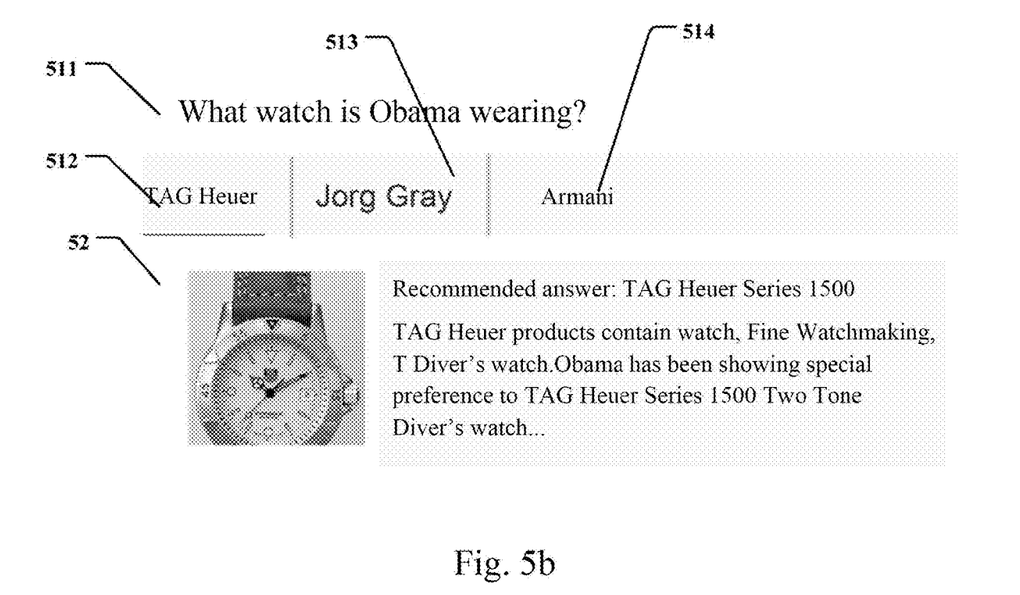

The terminal device receiving the search results pushed by the server may also display the respective search results by: creating a switchable tab on the search result page, and presenting respectively the each search result in each tab.

Referring to FIG. 5b, FIG. 5b is a schematic effect diagram of an application scenario of the method for providing a search result according to some embodiments of the present disclosure. After the user types the search term "what watch is Obama wearing" in the search box 511 in a browser provided by the terminal device or other applications that may support the search, the electronic device may initiate a search request to the server. The server performs the search intent analysis on the search term, and may determine that the search term contains the answer requirement based on the keyword "what" included in the search term. At this time, the server may use the search term to retrieve the answer content corresponding to the answer requirement: "TAG Heuer," "Jorg Gray" and "Armani." Afterwards, the server may find introductions and advertisements respectively corresponding to the watch brands "TAG Heuer," "Jorg Gray" and "Armani" from an advertisement database at the backend, combine respectively the watch brands and the corresponding introductions and advertisements as the respective search results, and then push the search results to the electronic device. The electronic device may create three corresponding tabs 512, 513 and 514 in the search result page 52, and respectively display corresponding watch brand names and the brand introductions and advertisements corresponding to the brand names in the tabs. Further, the tabs may be switched by clicking or through a gesture operation, to facilitate the user acquiring different answer content and recommended content associated with the answer content.

Figure 5C:
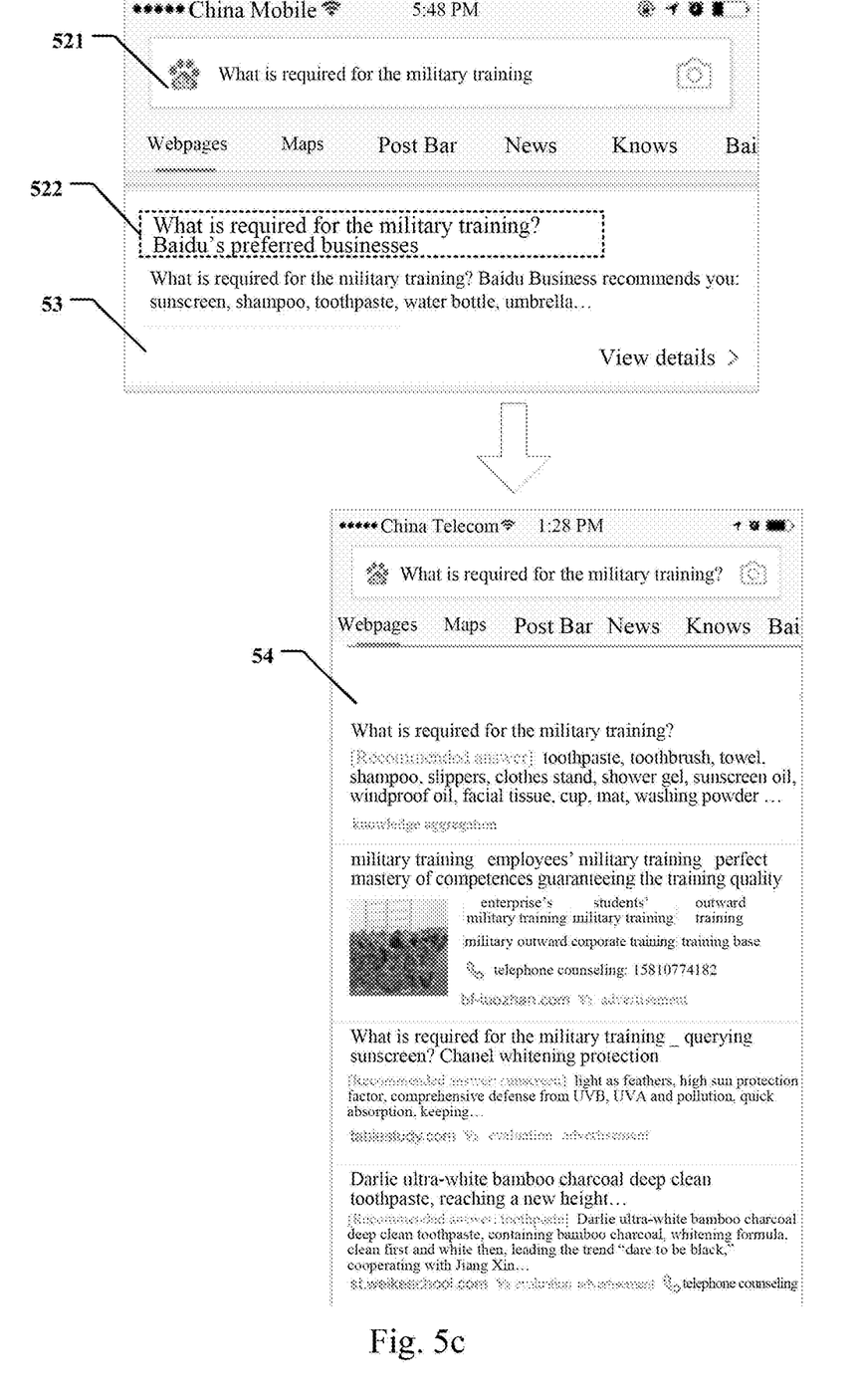

In some alternative implementations, if the server creates the link for pointing to the page including the plurality of search results after generating the search results, and pushes the link, the terminal device may display the pushed link in the search result page. FIG. 5c is a schematic effect diagram of an application scenario of the method for providing a search result according to some embodiments of the present disclosure.

As shown in FIG. 5c, after the user types the search term. "what is required for the military training" in the search box 521 in a browser provided by the terminal device or other applications that may support the search, the terminal may initiate a search request to the server. The server performs the search intent analysis on the search term, and may determine that the search term contains the answer requirement based on the keyword "what" included in the search term. At this time, the server may use the search term to retrieve the answer content corresponding to the answer requirement: "sunscreen," "toothpaste," etc. Afterwards, the server may find a sunscreen advertisement and a toothpaste advertisement from an advertisement database at the backend, combine the answer content "sunscreen" and the sunscreen advertisement as one search result, and combine the answer content "toothpaste" and the toothpaste advertisement as the other search result. Then, the server may create the link 522 pointing to the network address of the page 54. The page 54 contains the search result formed by combining the sunscreen and the sunscreen advertisement and the search result formed by combining the toothpaste and toothpaste advertisement. The server may push the link 522 to the terminal device sending the search request, and the terminal device may display the link 522 in the search result page 53. The page 54 is presented when the link 522 is clicked on. Thus, the display space occupied by the search results may be reduced while the search results are enriched and the information acquisition efficiency of the user is improved.

It may be seen from the above that, as compared with the embodiment shown in FIG. 2, the flow 400 of the method for providing a search result in this embodiment adds the step 405 of pushing the search results. Through step 405, the generated search results may be pushed to the terminal device receiving the search term for display, so that the user may efficiently acquire the information.

Figure 6:
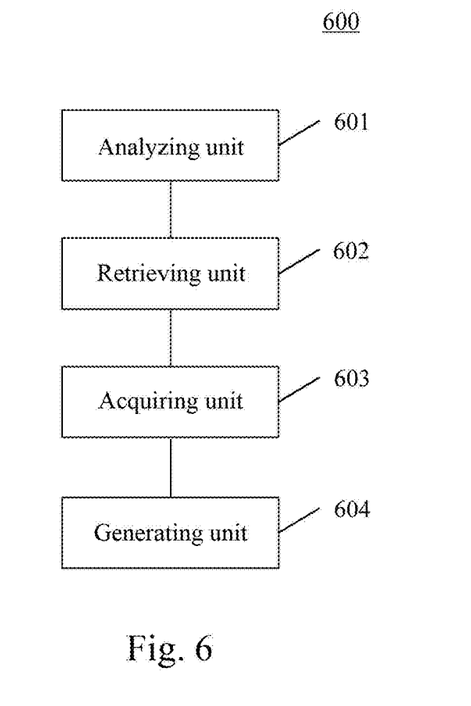
FIG. 6 is a schematic structural diagram of an embodiment of an apparatus for providing a search result.

Referring to FIG. 6, as an implementation of the method shown in the above drawings, the present disclosure provides an embodiment of an apparatus for providing a search result. An embodiment of the apparatus may correspond to the embodiment of the method shown in FIG. 2, and the apparatus may be applied in various electronic devices.

As shown in FIG. 6, the apparatus 600 for providing a search result in this embodiment includes: an analyzing unit 601, a retrieving unit 602, an acquiring unit 603 and a generating unit 604. The analyzing unit 601 is configured to perform a search intent analysis on an inputted search term, to determine whether the search term contains an answer requirement. The retrieving unit 602 is configured to retrieve, in response to determining the search term containing the answer requirement, answer content corresponding to the answer requirement using the search term. The acquiring unit 603 is configured to acquire to-be-recommended content associated with the answer content. The generating unit 604 is configured to combine the answer content and the to-be-recommended content, to generate at least one search result.

In this embodiment, the analyzing unit 601 may acquire the search term inputted by the user, and analyze the search term using a method such as word segmentation and a machine learning method, to determine whether the search term contains the answer requirement.

When determining the analysis result of the analyzing unit 601 being that the search term contains the answer requirement, the retrieving unit 602 may directly retrieve using the search term, filter a retrieval result of an answer category, and extract the answer content in the retrieval result of the answer category. Alternatively, when the search intent analysis is performed on the search term, the answer requirement corresponding to the search term may be analyzed, and the answer content is obtained by retrieving based on the answer requirement.

The acquiring unit 603 may find the to-be-recommended content associated with the answer content from a to-be-recommended content library. The to-be-recommended content associated with the answer content may be to-be-recommended content having a semantic relevance to the answer content that exceeds a preset threshold.

The generating unit 604 may combine the answer content and the to-be-recommended content associated with the answer content to generate the search result. If the retrieving unit 602 retrieves a plurality of pieces of answer content, the generating unit 604 may generate a plurality of corresponding search results in this embodiment.

In some alternative implementations of this embodiment, the analyzing unit 601 may be further configured to determine whether the search term contains the answer requirement by: matching the search term and a preset question keyword library; and determining, if the matching is successful, the search term containing the answer requirement.

In some alternative implementations of this embodiment, the analyzing unit 601 may be further configured to determine whether the search term contains the answer requirement by: acquiring a historical search result of the search term and category information of the historical search result; and determining, in response to determining the acquired category information being a question-answer category or a content recommendation category, the search term containing the answer requirement.

In some alternative implementations of this embodiment, the acquiring unit 603 may be further configured to acquire the to-be-recommended content associated with the answer content by: extracting a keyword, in the answer content, corresponding to the answer requirement; matching the extracted keyword and a preset keyword configured for preset recommendation content; and defining preset recommendation content corresponding to the successfully matched preset keyword as the to-be-recommended content associated with the answer content.

In some alternative implementations of this embodiment, the generating unit 604 may be further configured to generate the at least one search result by: combining the extracted keyword and the preset recommendation content corresponding to the keyword, to generate a corresponding search result.

In some alternative implementations of this embodiment, the apparatus 600 further includes a pushing unit (not shown), configured to push each search result. Further, the pushing unit may be further configured to push the each search result by: pushing the each search result to a search result page for display; and/or creating a link for pointing to a page including a plurality of search results, and pushing the link.

In the embodiment of the apparatus 600 for providing a search result, the search intent of the user may be analyzed, and the to-be-recommended content associated with the retrieved answer content may be found. Thus, more abundant search results may be provided, thereby improving the efficiency of providing the information for the user.

Embodiments of the present disclosure further provide a server. The server includes one or more processors, and a storage device. The storage device is configured to store one or more programs. The one or more programs stored in the storage device, when executed by the one or more processors, cause the one or more processors to implement the method for providing a search result provided in some embodiments of the present disclosure.

Figure 7:
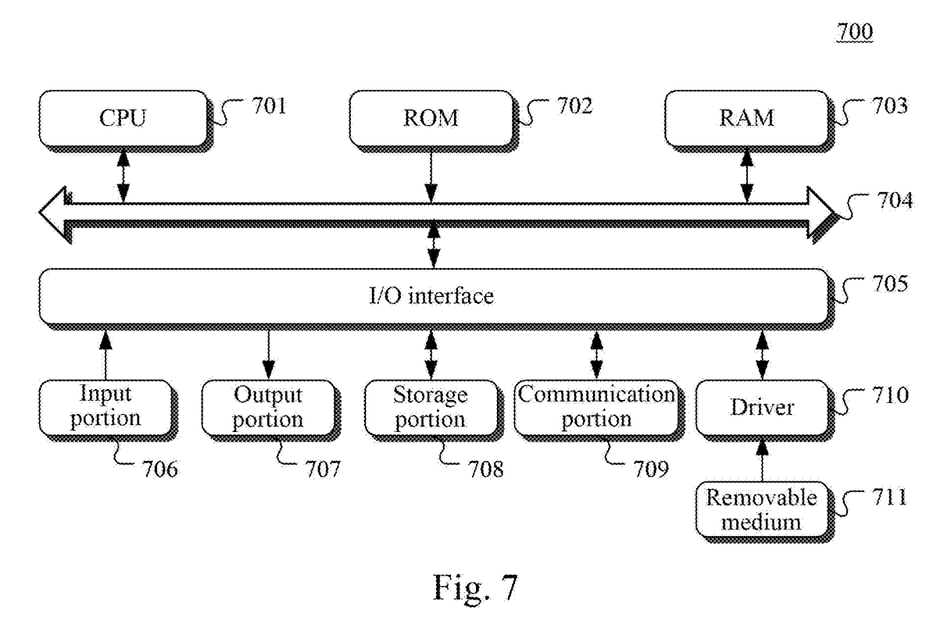
FIG. 7 is a schematic structural diagram of a computer system adapted to implement a terminal device or a server according to some embodiments of the present disclosure.

Referring to FIG. 7, FIG. 7 is a schematic structural diagram of a computer system 700 adapted to implement a server of some embodiments of the present disclosure. The server shown in FIG. 7 is merely an example, and should not bring any limitations to the functions and the scope of use of some embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card such as a LAN card and a modem. The communication portion 709 performs communication processes via a network such as the Internet. A driver 710 is also connected to the I/O interface 705 as required. A removable medium 711 such as a magnetic disk, an optical disk, a magneto-optical disk, and a semiconductor memory may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 709, and/or may be installed from the removable medium 711. The computer program, when executed by the central processing unit (CPU) 701, implements the above mentioned functionalities as defined by the methods of some embodiments of the present disclosure. It should be noted that the computer readable medium may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. The computer readable storage medium may be any physical medium containing or storing programs, which may be used by a command execution system, apparatus or element or incorporated thereto. The computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or element. The program codes contained on the computer readable medium may be transmitted with any suitable medium including, but not limited to, wireless, wired, optical cable, RF medium, or any suitable combination of the above.

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in some embodiments of the present disclosure may be implemented by means of software or hardware. The described units may also be provided in a processor, for example, described as: a processor, comprising an analyzing unit, a retrieving unit, an acquiring unit and a generating unit. The names of these units do not in some cases constitute a limitation to such units themselves. For example, the analyzing unit may also be described as "a unit for performing a search intent analysis on an inputted search term, to determine whether the search term contains an answer requirement."

In another aspect, the present disclosure further provides a computer readable medium. The computer readable medium may be the computer readable medium included in the apparatus described in the above embodiments, or a stand-alone computer readable medium not assembled into the apparatus. The computer readable medium stores one or more programs. The one or more programs, when executed by the apparatus, cause the apparatus to: perform a search intent analysis on an inputted search term, to determine whether the search term contains an answer requirement; retrieve, if the search term contains the answer requirement, answer content corresponding to the answer requirement using the search term; acquire to-be-recommended content associated with the answer content; and combine the answer content and the to-be-recommended content, to generate at least one search result.

The above description is only an explanation for embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of an invention, for example, technical solutions formed by replacing the features as disclosed in the present disclosure with (but not limited to) technical features with similar functions.

What is claimed is:

1. A method for providing a search result, comprising:
performing a word segmentation on an inputted search term, and performing a search intent analysis based on the word segmentation result and the search term using a trained search intent analysis model in a machine learning approach, to acquire a historical search result of the search term and category information of the historical search result, and determine, in response to determining the acquired category information being a question-answer category or a content recommendation category, the search term containing the answer requirement, wherein the category information of each historical search result is determined by a source website of the historical search result and a category of the content of the historical search result;
in response to determining that the search term contains the answer requirement, retrieving an answer content corresponding to the answer requirement using the search term;
acquiring to-be-recommended content associated with the answer content;
combining the answer content and the to-be-recommended content, to generate at least one search result; and
creating a plurality of entry columns for displaying simultaneously a plurality of search results of the at least one search result in a search result page, wherein the answer content of each search result is displayed along with the to-be-recommended content associated with the answer content.

2. The method according to claim 1, wherein the combining the answer content and the to-be-recommended content, to generate at least one search result includes:
combining extracted keywords and preset recommendation content corresponding to the keywords, to generate a corresponding search result.

3. The method according to claim 1, further comprising: pushing each search result.

4. The method according to claim 3, wherein the pushing each search result includes:
ranking matching degrees corresponding to the at least one search result;
pushing the ranked search result to the search result page for display; and
creating a link for pointing to a page including the at least one search results, and pushing the link.

5. The method according to claim 1, wherein the acquiring to-be-recommended content associated with the answer content includes:
extracting a keyword, in the answer content, corresponding to the answer requirement;
matching the extracted keyword and a preset keyword configured for preset recommendation content; and
defining preset recommendation content corresponding to the successfully matched preset keyword as the to-be-recommended content associated with the answer content.

6. An apparatus for providing a search result, comprising: at least one processor; and a memory storing instructions, the instructions when executed by the at least one processor, cause the at least one processor to perform operations, the operations comprising:

performing a word segmentation on an inputted search term, and performing a search intent analysis based on the word segmentation result and the search term using a trained search intent analysis model in a machine learning approach, to acquire a historical search result of the search term and category information of the historical search result, and determine, in response to determining the acquired category information being a question-answer category or a content recommendation category, the search term containing the answer requirement, wherein the category information of each historical search result is determined by a source website of the historical search result and a category of the content of the historical search result;

in response to determining that the search term contains the answer requirement, retrieving an answer content corresponding to the answer requirement using the search term;

acquiring to-be-recommended content associated with the answer content; and combining the answer content and the to-be-recommended content, to generate at least one search result; and creating a plurality of entry columns for displaying simultaneously a plurality of search results of the at least one search result in a search result page, wherein the answer content of each search result is displayed along with the to-be-recommended content associated with the answer content.

7. The apparatus according to claim 6, wherein the combining the answer content and the to-be-recommended content, to generate at least one search result includes:

combining extracted keywords and preset recommendation content corresponding to the keywords, to generate a corresponding search result.

8. The apparatus according to claim 6, the operations further comprising:

pushing each search result.

9. The apparatus according to claim 8, wherein the pushing each search result includes:

ranking matching degrees corresponding to the at least one search result;

pushing the ranked search result to the search result page for display; and creating a link for pointing to a page including the at least one search results, and pushing the link.

10. The apparatus according to claim 6, wherein the acquiring to-be-recommended content associated with the answer content includes:

extracting a keyword, in the answer content, corresponding to the answer requirement;

matching the extracted keyword and a preset keyword configured for preset recommendation content; and defining preset recommendation content corresponding to the successfully matched preset keyword as the to-be-recommended content associated with the answer content.

11. A non-transitory computer readable storage medium, storing a computer program, wherein the computer program, when executed by a processor, causes the processor to perform operations, the operations comprising:

performing a word segmentation on an inputted search term, and performing a search intent analysis based on the word segmentation result and the search term using a trained search intent analysis model in a machine learning approach, to acquire a historical search result of the search term and category information of the historical search result, and determine, in response to determining the acquired category information being a question-answer category or a content recommendation category, the search term containing the answer requirement, wherein the category information of each historical search result is determined by a source website of the historical search result and a category of the content of the historical search result;

in response to determining that the search term contains the answer requirement, retrieving an answer content corresponding to the answer requirement using the search term;

acquiring to-be-recommended content associated with the answer content;

combining the answer content and the to-be-recommended content, to generate at least one search result; and creating a plurality of entry columns for displaying simultaneously a plurality of search results of the at least one search result in a search result page, wherein the answer content of each search result is displayed along with the to-be-recommended content associated with the answer content.

* * * * *